(12) United States Patent
Katz et al.

(10) Patent No.: US 12,458,438 B2
(45) Date of Patent: Nov. 4, 2025

(54) CARDIAC VEIN ABLATION VISUALIZATION SYSTEM AND CATHETER

(71) Applicant: Biosense Webster (Israel) Ltd., Yokneam (IL)

(72) Inventors: Natan Sharon Katz, Atlit (IL); Dror Berman, Irvine, CA (US); Benjamin Cohen, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 416 days.

(21) Appl. No.: 17/994,722

(22) Filed: Nov. 28, 2022

(65) Prior Publication Data
US 2023/0181246 A1  Jun. 15, 2023

Related U.S. Application Data

(60) Provisional application No. 63/288,034, filed on Dec. 10, 2021.

(51) Int. Cl.
| A61B 18/14 | (2006.01) |
| A61B 34/20 | (2016.01) |
| A61B 18/00 | (2006.01) |

(52) U.S. Cl.
CPC .......... *A61B 18/1492* (2013.01); *A61B 34/20* (2016.02); *A61B 2018/00577* (2013.01)

(58) Field of Classification Search
USPC ....................................................... 382/128
See application file for complete search history.

(56) References Cited

U.S. PATENT DOCUMENTS

| 5,391,199 A | 2/1995 | Ben-Haim |
| 5,443,489 A | 8/1995 | Ben-Haim |
| 5,558,091 A | 9/1996 | Acker et al. |
| 6,172,499 B1 | 1/2001 | Ashe |
| 6,239,724 B1 | 5/2001 | Doron et al. |
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |

(Continued)

FOREIGN PATENT DOCUMENTS

| EP | 3666217 A1 | 6/2020 |
| WO | 2020/154543 A1 | 7/2020 |

OTHER PUBLICATIONS

International Search Report for corresponding PCT appln. No. PCT/B2022/062026 dated Mar. 6, 2023.

*Primary Examiner* — Jacky X Zheng
(74) *Attorney, Agent, or Firm* — Volpe Koenig

(57) ABSTRACT

A computing system is provided. The computing system includes a memory storing processor executable code. The computing system includes processors executing the code. The code causes the computing system to generate a graphical user interface that includes topological maps constructed from a three-dimensional anatomical model of a portion of an anatomical feature. The topological maps include an interior map view of the portion of the anatomical feature from a perspective of a device inserted into a patient. The code causes the computing system to generate a device icon on each of the topological maps. The device icon presents a real time position of an ablating surface of the device in relation to each map view of the topological maps.

20 Claims, 5 Drawing Sheets

(56) References Cited

U.S. PATENT DOCUMENTS

| | | |
|---|---|---|
| 6,788,967 B2 | 9/2004 | Ben-Haim et al. |
| 6,892,091 B1 | 5/2005 | Ben-Haim et al. |
| 7,536,218 B2 | 5/2009 | Govari et al. |
| 7,756,576 B2 | 7/2010 | Levin |
| 7,848,787 B2 | 12/2010 | Osadchy |
| 7,869,865 B2 | 1/2011 | Govari et al. |
| 8,456,182 B2 | 6/2013 | Bar-tal et al. |
| 9,147,289 B2 | 9/2015 | Bourier et al. |
| 10,321,878 B2 | 6/2019 | Katz et al. |
| 10,842,572 B1 | 11/2020 | Viswanathan |
| 11,039,888 B2 | 6/2021 | Schwartz et al. |
| 2013/0184569 A1 | 7/2013 | Strommer |
| 2016/0155274 A1 | 6/2016 | Merschon |
| 2020/0107877 A1 | 4/2020 | Koblish et al. |
| 2020/0315709 A1* | 10/2020 | Shmayahu ......... A61B 18/1492 |
| 2021/0082157 A1 | 3/2021 | Rosenberg et al. |
| 2021/0137588 A1 | 5/2021 | Adawi et al. |
| 2021/0196399 A1* | 7/2021 | Ayvali ................... A61B 34/30 |

\* cited by examiner

CARDIAC VEIN ABLATION VISUALIZATION SYSTEM AND CATHETER

INCORPORATION BY REFERENCE

This application claims priority to U.S. Provisional Application No. 63/288,034, which was filed on Dec. 10, 2021, and is incorporated herein by reference in its entirety.

FIELD OF INVENTION

The systems and methods herein relate generally to signal processing.

BACKGROUND

Cardiac imaging by conventional systems and methods includes generating three-dimensional (3D) images of a heart. For example, a medical professional guides a catheter through blood vessels of a patient until the catheter is inside a heart. While being guided, the catheter senses electrical activity that conventional systems and methods analyze to provide the 3D images. The 3D images are used by the medical professional (e.g., a physician) when performing procedures, such as a cardiac ablation to treat an arrhythmia (e.g., atrial fibrillation or aFib), and enable medical professionals to determine a source location of the arrhythmia.

However, these 3D images are crude surface perspective views because the conventional systems and methods are not suited for detailed heart mapping. That is, conventional systems and methods that generate the least 3D images fail to provide detailed cardiac vein ablation visualization.

For instance, pulmonary vein (PV) isolation is a type of cardiac ablation procedure to treat aFib. The catheter can provide a one-shot PV ablation using an ablating surface (e.g., circular or spherical in shape). The ablating surface is sized to make full contact with an internal circumference of a PV wall to form an ablation ring. Yet, with PV isolation, approaching a PV with the catheter with such an ablating surface requires an expert understanding of 3D modeling do to the crudeness of these 3D images. In other words, it is very difficult for the medical professional to understand a 3D positioning of a circular or a spherical ablating surface with respect to an inside of the PV because the conventional systems and methods generate such crude 3D images. Further, as the catheter approaches the PV, the catheter can provide an overload of data to the conventional systems and methods. This overload of data is extremely difficult to process by the conventional systems and methods and blurs the 3D images, which further increases the difficultly of placing the catheter as desired in relation to the PV. In addition, the 3D images can include annotations of ablated areas (e.g., purple spheres or VISITAGS™). The annotation can produce more visual clutter than visual clarity that further aggravates the medical professional's understanding of the 3D positioning of the ablating surface.

SUMMARY

According to one or more embodiments, a computing system is provided. The computing system includes a memory storing processor executable code. The computing system includes at least one processor executing the code. The code causes the computing system to generate a graphical user interface that includes one or more topological maps constructed from a three-dimensional anatomical model of a portion of an anatomical feature. The one or more topological maps include at least one interior map view of the portion of the anatomical feature from a perspective of a device inserted into a patient. The code causes the computing system to generate a device icon on each of the one or more topological maps. The device icon presents a real time position of an ablating surface of the device in relation to each map view of the one or more topological maps. According to one or more embodiments, the exemplary computing system embodiment above can be implemented as an apparatus, a method, and/or a computer program product.

According to one or more embodiments, a mapping engine implemented in processor executable code of medical device equipment is provided. The medical device equipment includes a memory storing the processor executable code and at least one processor executing the processor executable code. The mapping engine executes to generate a graphical user interface. The graphical user interface includes an interior map view presenting a three-dimensional anatomical model of an interior portion of a heart. The interior map comprising lines or shading presenting texture and showing depth of the interior portion. The graphical user interface includes a device icon presenting a real time position of a catheter in relation to the interior portion of the heart. According to one or more embodiments, the exemplary mapping system embodiment above can be implemented as an apparatus, a method, a computing system, and/or a computer program product.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Disclosed herein are systems and methods that relate generally to signal processing. According to one or more embodiments, the systems and methods herein provide a mapping engine that generates detailed cardiac vein ablation visualizations by extracting and analyzing electrical activity of the heart and by analyzing interior and/or exterior 3D maps of the heart. By way of example, the mapping engine can be a processor executable code or software that is necessarily rooted in process operations by, and in processing hardware of, medical device equipment (e.g., a catheter and computer systems connected thereto). The mapping engine, during the process operation by the medical device equipment, implements a multi-step manipulation of the electrical activity of the heart to generate the detailed cardiac vein ablation visualizations that address a crudeness of conventional 3D images and visual clutter by annotations thereon. One or more advantages, technical effects, and/or benefits of the mapping engine, the multi-step manipulation of the electrical activity, and the detailed cardiac vein ablation visualizations include providing medical professionals with an improved understanding an electrophysiology with more precision that furthers efficiency and success of cardiac procedures.

Figure 1:
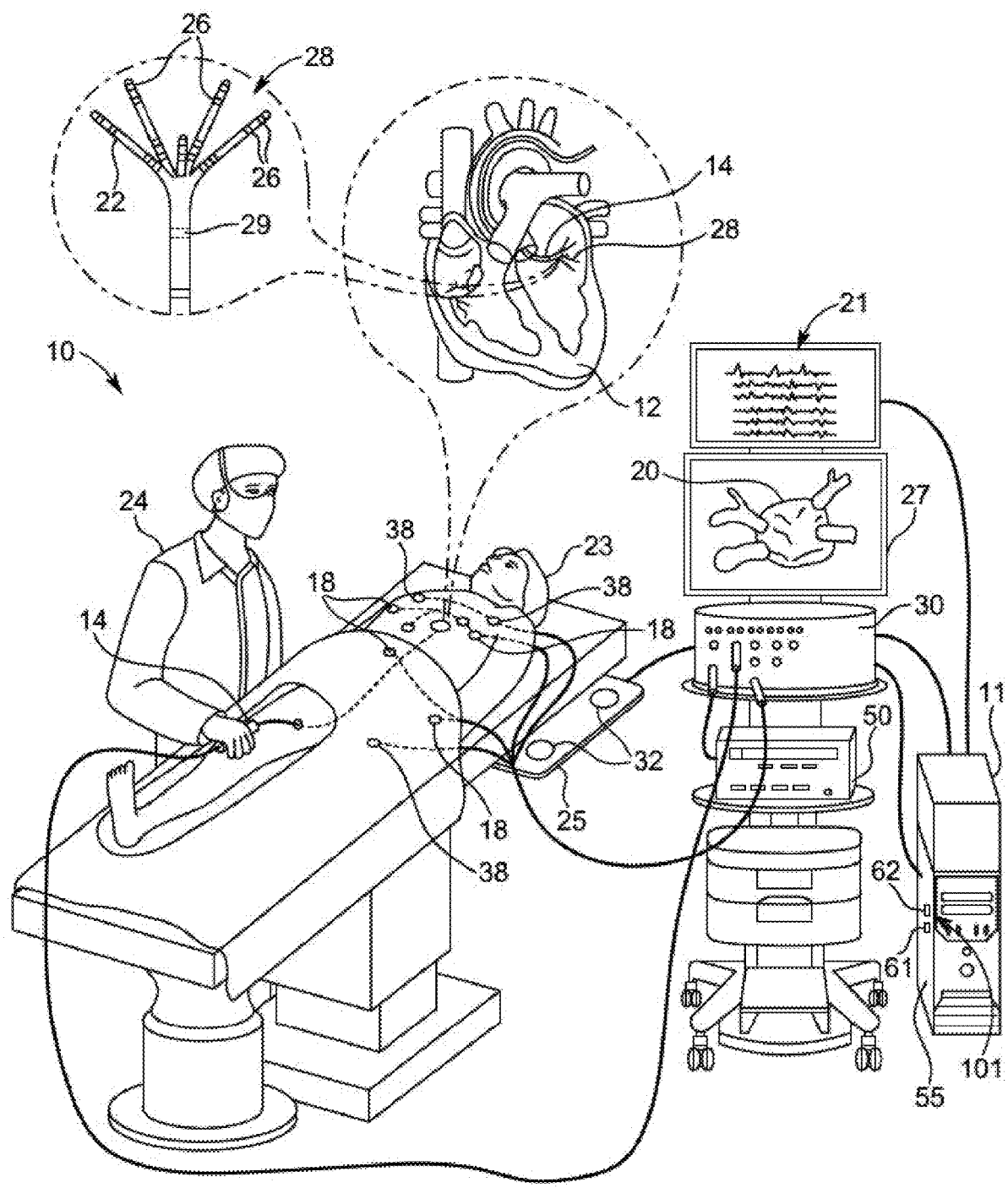
FIG. 1 illustrates a diagram of an example system in which one or more features of the disclosure subject matter can be implemented according to one or more embodiments.

FIG. 1 is a diagram of an example system (e.g., medical device equipment and/or catheter-based electrophysiology mapping and ablation system), shown as a system 10, in which one or more features of the subject matter herein can be implemented according to one or more embodiments. All or part of the system 10 can be used to collect information (e.g., biometric data and/or a training dataset) and/or used to implement a mapping engine 101 as described herein. The system 10, as illustrated, includes a recorder 11, a heart 12, a catheter 14, a model or anatomical map 20, an electrogram 21, a spline 22, a patient 23, a physician 24 (or a medical professional or clinician), a location pad 25, an electrode 26, a display device 27, a distal tip 28, a sensor 29, a coil 32, a patient interface unit (PIU) 30, electrode skin patches 38, an ablation energy generator 50, and a workstation 55 (including at least one processor 61 and at least one memory 62, storing a mapping engine 101 therein). Note that each element and/or item of the system 10 is representative of one or more of that element and/or that item. The example of the system 10 shown in FIG. 1 can be modified to implement the embodiments disclosed herein. The disclosed embodiments can similarly be applied using other system components and settings. Additionally, the system 10 can include additional components, such as elements for sensing electrical activity and/or physiological signals, wired or wireless connectors, processing and display devices, or the like. For ease of explanation, the mapping engine 101 is described herein with respect to mapping a heart 12; however, any anatomical structure, body part, organ, or portion thereof can be a target for mapping by the mapping engine 101 described herein.

The system 10 includes multiple catheters 14, which are percutaneously inserted by the physician 24 through the patient's 23 vascular system into a chamber or vascular structure of the heart 12. Typically, a delivery sheath catheter (which is an example of the catheter 14) is inserted into the left or right atrium near a desired location in the heart 12. Thereafter, a plurality of catheters 14 can be inserted into the delivery sheath catheter so as to arrive at the desired location. The plurality of catheters 14 may include catheters dedicated for sensing Intracardiac Electrogram (IEGM) signals, catheters dedicated for ablating and/or catheters dedicated for both sensing and ablating. The example catheter 14 that is configured for sensing IEGM is illustrated herein. The physician 24 brings the distal tip 28 of the catheter 14 into contact with the heart wall for sensing a target site in the heart 12. For ablation, the physician 24 would similarly bring a distal end of an ablation catheter to a target site for ablating.

The catheter 14 is an exemplary catheter that includes one and preferably multiple electrodes 26 optionally distributed over a plurality of splines 22 at the distal tip 28 and configured to sense the IEGM signals. The catheter 14 may additionally include the sensor 29 embedded in or near the distal tip 28 for tracking position and orientation of the distal tip 28. Optionally and preferably, position sensor 29 is a magnetic based position sensor including three magnetic coils for sensing three-dimensional (3D) position and orientation.

The sensor 29 (e.g., a position or a magnetic based position sensor) may be operated together with the location pad 25 including a plurality of magnetic coils 32 configured to generate magnetic fields in a predefined working volume. Real time position of the distal tip 28 of the catheter 14 may be tracked based on magnetic fields generated with the location pad 25 and sensed by the sensor 29. Details of the magnetic based position sensing technology are described in U.S. Pat. Nos. 5,391,199; 5,443,489; 5,558,091; 6,172,499; 6,239,724; 6,332,089; 6,484,118; 6,618,612; 6,690,963; 6,788,967; 6,892,091.

The system 10 includes one or more electrode patches 38 positioned for skin contact on the patient 23 to establish location reference for the location pad 25 as well as impedance-based tracking of the electrodes 26. For impedance-based tracking, electrical current is directed toward the electrodes 26 and sensed at the patches 38 (e.g., electrode skin patches) so that the location of each electrode can be triangulated via the patches 38. Details of the impedance-based location tracking technology are described in U.S. Pat. Nos. 7,536,218; 7,756,576; 7,848,787; 7,869,865; and 8,456,182, which are incorporated herein by reference.

The recorder 11 displays the electrograms 21 captured with the electrodes 18 (e.g., body surface electrocardiogram (ECG) electrodes) and IEGM captured with the electrodes 26 of the catheter 14. The recorder 11 may include pacing capability for pacing the heart rhythm and/or may be electrically connected to a standalone pacer.

The system 10 may include the ablation energy generator 50 that is adapted to conduct ablative energy to the one or more of electrodes 26 at the distal tip 28 of the catheter 14 configured for ablating. Energy produced by the ablation energy generator 50 may include, but is not limited to, radio frequency (RF) energy or pulsed-field ablation (PFA) energy, including monopolar or bipolar high-voltage DC pulses as may be used to effect irreversible electroporation (IRE), or combinations thereof.

The PIU 30 is an interface configured to establish electrical communication between catheters, electrophysiological equipment, power supply and the workstation 55 for controlling operation of the system 10. Electrophysiological equipment of the system 10 may include for example, multiple catheters 14, the location pad 25, the body surface ECG electrodes 18, the electrode patches 38, the ablation energy generator 50, and the recorder 11. Optionally and preferably, the PIU 30 additionally includes processing capability for implementing real-time computations of location of the catheters and for performing ECG calculations.

The workstation 55 includes the memory 62, the processor unit 61 with the memory 62 or storage with appropriate operating software loaded therein, and user interface capability, as further described herein. The workstation 55 may provide multiple functions, optionally including (1) modeling the endocardial anatomy in three-dimensions (3D) and rendering the model or anatomical map 20 for display on the display device 27, (2) displaying on the display device 27 activation sequences (or other data) compiled from recorded electrograms 21 in representative visual indicia or imagery superimposed on the rendered anatomical map 20, (3) displaying real-time location and orientation of multiple catheters within the heart chamber, and (5) displaying on the display device 27 sites of interest such as places where ablation energy has been applied. One commercial product embodying elements of the system 10 is available as the CARTO® 3 System, available from Biosense Webster, Inc., 31A Technology Drive, Irvine, CA 92618.

The system 10 can be utilized to detect, diagnose, and/or treat cardiac conditions (e.g., using the mapping engine 101). Cardiac conditions, such as cardiac arrhythmias, persist as common and dangerous medical ailments, especially in the aging population. For instance, the system 10 can be part of a surgical system (e.g., CARTO® system sold by Biosense Webster) that is configured to obtain biometric data (e.g., anatomical and electrical measurements of a patient's organ, such as the heart 12 and as described herein) and perform a cardiac ablation procedure. More particularly, treatments for cardiac conditions such as cardiac arrhythmia often require obtaining a detailed mapping of cardiac tissue, chambers, veins, arteries and/or electrical pathways. For example, a prerequisite for performing a catheter ablation (as described herein) successfully is that the cause of the cardiac arrhythmia is accurately located in a chamber of the heart 12. Such locating may be done via an electrophysiological investigation during which electrical potentials are detected spatially resolved with a mapping catheter (e.g., the catheter 14) introduced into the chamber of the heart 12. This electrophysiological investigation, the so-called electro-anatomical mapping, thus provides 3D mapping data which can be displayed on the display device 27. In many cases, the mapping function and a treatment function (e.g., ablation) are provided by a single catheter or group of catheters such that the mapping catheter also operates as a treatment (e.g., ablation) catheter at the same time. According to one or more embodiments, the mapping engine 101 can be directly stored and executed by the catheter 14.

According to one or more embodiments, the mapping engine 101 performs an electrocardiograph and/or an intracardiac electrogram (ECG/ICEG). The ECG/ICEG are processes of decomposing/analyzing/recording electrical activity of the heart 12 over a period of time using the physiological signals of the plurality of electrodes 18 and 26 (e.g., with the ICEG, at least one of the electrodes 26 is inside the heart 12). That is, in support of the system 10 detecting, diagnosing, and/or treating cardiac conditions, the one or more catheters 14 can be navigated by the physician 24 into the heart 12 of the patient 23. In turn, the plurality of electrodes 18 and 26 detect and provide signals (a.k.a., physiological signals), which the mapping engine 101 uses to identify small electrical changes that arise from the heart muscle's electro-physiologic pattern of depolarizing during each heartbeat. The ECG/ICEG can be performed over a period of time, for example, such as ten (10) seconds. In this way, the overall magnitude and direction of the electrical depolarization at the heart 12 is captured at each moment throughout the cardiac cycle. The ECG/ICEG can be recorded during a diagnostic or therapeutic procedure. The procedure duration may vary from tens of minutes to several hours. During each therapeutic procedure, usually there are several dozens of ablation sessions, each of which last several seconds up to approximately 1 minute, for example.

According to one or more embodiments, to the physician 24, the ECG/ICEG conveys a large amount of information about a structure of the heart 12 and a function of its electrical conduction system. During each heartbeat, a healthy heart has an orderly progression of depolarization. This orderly pattern of depolarization gives rise to the characteristic ECG/ICEG tracing. Additionally, among other things, the ECG/ICEG can be used to measure the rate and rhythm of heartbeats, the size and position of the heart chambers, the presence of any damage to the muscle cells or conduction system of the heart 12, the effects of cardiac drugs, and the function of implanted pacemakers. The mapping engine 101 provides the technical effect, advantage, and benefit of signal interpretation of the ECG/ICEG in support of fundamentally understanding the electrical conduction system of the heart 12, as normal conduction starts and propagates in a predictable pattern, and deviation from this pattern can be a normal variation or be pathological. Note that the mapping engine 101 can be considered an electrocardiograph, while a test by and an output of the mapping engine 101 can be considered an electrocardiography and electrocardiogram (i.e., graph of voltage versus time), respectively. For the sake of brevity, electrocardiography, electrocardiograph, and electrocardiogram can all be referred to herein as ECG, and may also be referred to as EKG.

According to one or more embodiments, the mapping engine 101 can apply to an IRE, such a PFA, where the catheter 14 needs to be correctly placed within a vein of an atria of the heart 14.

In patients (e.g., the patient 23) with normal sinus rhythm (NSR), the heart (e.g., the heart 12), which includes atrial, ventricular, and excitatory conduction tissue, is electrically excited to beat in a synchronous, patterned fashion. Note that this electrical excitement can be detected as intracardiac electrocardiogram (IC ECG) data or the like.

According to one or more embodiments, in patients (e.g., the patient 23) with a cardiac arrhythmia (e.g., aFib), abnormal regions of cardiac tissue do not follow a synchronous beating cycle associated with normally conductive tissue, which is in contrast to patients with NSR. Instead, the abnormal regions of cardiac tissue aberrantly conduct to adjacent tissue, thereby disrupting the cardiac cycle into an asynchronous cardiac rhythm. Note that this asynchronous cardiac rhythm can also be detected as the IC ECG data. Such abnormal conduction has been previously known to occur at various regions of the heart 12, for example, in the region of the sino-atrial (SA) node, along the conduction pathways of the atrioventricular (AV) node, or in the cardiac muscle tissue forming the walls of the ventricular and atrial cardiac chambers. There are other conditions, such as flutter, where the pattern of abnormally conducting tissues lead to reentry paths such that the chamber beats in a regular pattern that can be multiple times the sinus rhythm.

By way of example, in support of the system 10 detecting, diagnosing, and/or treating cardiac conditions, the catheter 14 can be navigated by the physician 24 into the heart 12 of the patient 23 lying on the bed. For instance, the physician 24 can insert the shaft through the sheath, while manipulating a distal end of the shaft using the manipulator near the proximal end of the catheter 14 and/or deflection from the sheath. According to one or more embodiments, the catheter 14 can be fitted at the distal end of the shaft. The catheter 14 can be inserted through the sheath in a collapsed state and can be then expanded within the heart 12.

Generally, electrical activity at a point in the heart 12 may be typically measured by advancing the catheter 14 containing an electrical sensor (e.g., the sensor 29) at or near its distal tip (e.g., the at least one electrode 26) to that point in the heart 12, contacting the tissue with the sensor and acquiring data at that point. One drawback with mapping a cardiac chamber using a catheter type containing only a single, distal tip electrode is the long period of time required to accumulate data on a point-by-point basis over the requisite number of points required for a detailed map of the chamber as a whole. Accordingly, multiple-electrode catheters (e.g., the catheter 14) have been developed to simultaneously measure electrical activity at multiple points in the heart chamber.

The catheter 14, which can include the at least one electrode 26 and a catheter needle coupled onto a body thereof, can be configured to obtain biometric data, such as electrical signals of an intra-body organ (e.g., the heart 12), and/or to ablate tissue areas of thereof (e.g., a cardiac chamber of the heart 12). Note that the electrodes 26 are representative of any like elements, such as tracking coils, piezoelectric transducer, electrodes, or combination of elements configured to ablate the tissue areas or to obtain the biometric data. According to one or more embodiments, the catheter 14 can include one or more position sensors that used are to determine trajectory information. The trajectory information can be used to infer motion characteristics, such as the contractility of the tissue.

Biometric data (e.g., patient biometrics, patient data, or patient biometric data) can include one or more of local activation times (LATs), electrical activity, topology, bipolar mapping, reference activity, ventricle activity, dominant frequency, impedance, or the like. The LAT can be a point in time of a threshold activity corresponding to a local activation, calculated based on a normalized initial starting point. Electrical activity can be any applicable electrical signals that can be measured based on one or more thresholds and can be sensed and/or augmented based on signal to noise ratios and/or other filters. A topology can correspond to the physical structure of a body part or a portion of a body part and can correspond to changes in the physical structure relative to different parts of the body part or relative to different body parts. A dominant frequency can be a frequency or a range of frequency that is prevalent at a portion of a body part and can be different in different portions of the same body part. For example, the dominant frequency of a PV of a heart can be different than the dominant frequency of the right atrium of the same heart. Impedance can be the resistance measurement at a given area of a body part.

Examples of biometric data include, but are not limited to, patient identification data, IC ECG data, bipolar intracardiac reference signals, anatomical and electrical measurements, trajectory information, body surface (BS) ECG data, historical data, brain biometrics, blood pressure data, ultrasound signals, radio signals, audio signals, a two- or three-dimensional (3D) image data, blood glucose data, and temperature data, or other electrical activity and/or physiological signals. The biometrics data can be used, generally, to monitor, diagnosis, and treatment any number of various diseases, such as cardiovascular diseases (e.g., arrhythmias, cardiomyopathy, and coronary artery disease) and autoimmune diseases (e.g., type I and type II diabetes). Note that BS ECG data can include data and signals collected from electrodes on a surface of a patient, IC ECG data can include data and signals collected from electrodes within the patient, and ablation data can include data and signals collected from tissue that has been ablated. Further, BS ECG data, IC ECG data, and ablation data, along with catheter electrode position data, can be derived from one or more procedure recordings.

For example, the catheter 14 can use the electrodes 26 to implement intravascular ultrasound and/or MRI catheterization to image the heart 12 (e.g., obtain and process the biometric data). The catheter 14 is shown in an enlarged view, inside a cardiac chamber of the heart 12. It will be understood that any shape that includes one or more electrodes 26 can be used to implement the embodiments disclosed herein.

Examples of the catheter 14 include, but are not limited to, a linear catheter with multiple electrodes, a balloon catheter including electrodes dispersed on multiple spines that shape the balloon, a lasso, a catheter with electrodes in shape of a grid or loop catheter with multiple electrodes, a high density catheter, or any other applicable shape or complexity. Linear catheters can be fully or partially elastic such that it can twist, bend, and or otherwise change its shape based on received signal and/or based on application of an external force (e.g., cardiac tissue) on the linear catheter. The balloon catheter is designed such that when deployed into a patient's body, its electrodes can be held in intimate contact against an endocardial surface. As an example, a balloon catheter can be inserted into a lumen, such as a pulmonary vein (PV). The balloon catheter can be inserted into the PV in a deflated state, such that the balloon catheter does not occupy its maximum volume while being inserted into the PV. The balloon catheter can expand while inside the PV, such that those electrodes on the balloon catheter are in contact with an entire circular section of the PV. Such contact with an entire circular section of the PV, or any other lumen, can enable efficient imaging and/or ablation. According to one or more embodiments, the catheter 14 can be a high-density mapping catheter with electrodes (e.g., at least three (3)) arranged in any combination of pairs. For example, the catheter 14 can include at least five (5) arms, and in some cases eight (8) or more, and the electrodes can include twenty (20) or forty-eight (48) unipolar electrodes positioned in pairs or couples 1 millimeter or 2 millimeter apart from one another (e.g., higher density improves performance). Examples of the high-density mapping catheter include, but are not limited to, Constellation catheter, an OCTARAY™ Mapping Catheter and/or PENTARAY® NAV ECO High Density Mapping Catheter by Biosense Webster®.

According to other examples, body patches and/or body surface electrodes (e.g., the one or more electrode patches 38) may also be positioned on or proximate to a body of the patient 23. The catheter 14 with the one or more electrodes 26 can be positioned within the body (e.g., within the heart 12) and a position of the catheter 14 can be determined by the 100 system based on signals transmitted and received between the one or more electrodes 26 of the catheter 14 and the body patches and/or body surface electrodes. Additionally, the electrodes 26 can sense the biometric data from within the body of the patient 23, such as within the heart 12 (e.g., the electrodes 26 sense the electrical potential of the tissue in real time). The biometric data can be associated with the determined position of the catheter 14 such that a rendering of the patient's body part (e.g., the heart 12) can be displayed and show the biometric data overlaid on a shape of the body part.

By way of further example, the catheter 14 and other items of the system 10 can be connected to the workstation 55. The workstation 55 can include any computing device, which employs the ML/AI algorithm (which can be included within the mapping engine 101). According to an exemplary embodiment, the workstation 55 includes the one or more processors 61 (any computing hardware) and the memory 62 (any non-transitory tangible media), where the one or more processors 61 execute computer instructions with respect the mapping engine 101 and the memory 62 stores these instructions for execution by the one or more processors 61. For instance, the workstation 55 can be configured to receive and process the biometric data and determine if a given tissue area conducts electricity. In some embodiments, the workstation 55 can be further programmed by the mapping engine 101 (in software) to carry out the functions of an ablation procedure guidance method. For example, the workstation 55 can be further programmed by the mapping engine 101 (in software) to carry out the functions of generating a graphical user interface presenting one or more topological maps constructed from a 3D anatomical model of a portion of an anatomical feature (e.g., a vein of an atria of the heart 12). The one or more topological maps can include at least one interior map view of the portion of the anatomical feature from a perspective of a device (e.g., the catheter 14 inserted into the patient 23. Also, the workstation 55 can be programmed by the mapping engine 101 (in software) to carry out the functions of generating a device icon on each of the one or more topological maps. The catheter icon can present a real time position of an ablating surface of the device in relation to each map view of the one or more topological maps. According to one or more embodiments, the mapping engine 101 can be external to the workstation 55 and can be located, for example, in the catheter 14, in an external device, in a mobile device, in a cloud-based device, or can be a standalone processor. In this regard, the mapping engine 101 can be transferable/downloaded in electronic form, over a network.

In an example, the workstation 55 can be any computing device, as noted herein, including software (e.g., the mapping engine 101) and/or hardware (e.g., the processor 61 and the memory 62), such as a general-purpose computer, with suitable front end and interface circuits for transmitting and receiving signals to and from the catheter 14, as well as for controlling the other components of the system 10. For example, the front end and interface circuits include input/output (I/O) communication interfaces that enables the workstation 55 to receive signals from and/or transfer signals to the at least one electrode 26. The workstation 55 can include real-time noise reduction circuitry typically configured as a field programmable gate array (FPGA), followed by an analog-to-digital (ND) ECG or electrocardiograph/electromyogram (EMG) signal conversion integrated circuit. The workstation 55 can pass the signal from an ND ECG or EMG circuit to another processor and/or can be programmed to perform one or more functions disclosed herein.

The display device 27, which can be any electronic device for the visual presentation of the biometric data, is connected to the workstation 55. According to an exemplary embodiment, during a procedure, the workstation 55 can facilitate on the display device 27 a presentation of a body part rendering to the physician 24 and store data representing the body part rendering in the memory 62. For instance, maps depicting motion characteristics can be rendered/constructed based on the trajectory information sampled at a sufficient number of points in the heart 12. As an example, the display device 27 can include a touchscreen that can be configured to accept inputs from the physician 24, in addition to presenting the body part rendering.

In some embodiments, the physician 24 may manipulate the elements of the system 10 and/or the body part rendering using one or more input devices, such as a touch pad, a mouse, a keyboard, a gesture recognition apparatus, or the like. For example, an input device can be used to change a position of the catheter 14, such that rendering is updated. Note that the display device 27 can be located at a same location or a remote location, such as a separate hospital or in separate healthcare provider networks.

According to one or more embodiments, the system 10 can also obtain the biometric data using ultrasound, computed tomography (CT), MRI, or other medical imaging techniques utilizing the catheter 14 or other medical equipment. For instance, the system 10 can obtain ECG data and/or anatomical and electrical measurements of the heart 12 (e.g., the biometric data) using one or more catheters 14 or other sensors. More particularly, the workstation 55 can be connected, by a cable, to BS electrodes, which include adhesive skin patches affixed to the patient 23. The BS electrodes can procure/generate the biometric data in the form of the BS ECG data. For instance, the processor 61 can determine position coordinates of the catheter 14 inside the body part (e.g., the heart 12) of the patient 23. The position coordinates may be based on impedances or electromagnetic fields measured between the body surface electrodes and the electrode 26 of the catheter 14 or other electromagnetic components. Additionally, or alternatively, location pads, which generate magnetic fields used for navigation, may be located on a surface of a bed (or a table), and may be separate from the bed. The biometric data can be transmitted to the workstation 55 and stored in the memory 62. Alternatively, or in addition, the biometric data may be transmitted to a server, which may be local or remote, using a network as further described herein.

According to one or more embodiments, the catheter 14 may be configured to ablate tissue areas of a cardiac chamber of the heart 12. For instance, the catheter 14, in an enlarged view, inside a cardiac chamber of the heart 12. Further, ablation electrodes, such as the at least one electrode 26, may be configured to provide energy to tissue areas of an intra-body organ (e.g., the heart 12). The energy may be thermal energy and may cause damage to the tissue area starting from the surface of the tissue area and extending into the thickness of the tissue area. The biometric data with respect to ablation procedures (e.g., ablation tissues, ablation locations, etc.) can be considered ablation data.

According to one or more embodiments, the mapping engine 101 can utilize the biometric data to perform cardiac mapping. Cardiac mapping by the mapping engine 101 can be implemented using one or more techniques. Generally, mapping of cardiac areas such as cardiac regions, tissue, veins, arteries and/or electrical pathways of the heart 12 may result in identifying problem areas such as scar tissue, arrhythmia sources (e.g., electric rotors), healthy areas, and the like. Cardiac areas may be mapped such that a visual rendering of the mapped cardiac areas is provided using a display, as further disclosed herein. Additionally, cardiac mapping (which is an example of heart imaging) may include mapping based on one or more modalities such as, but not limited to LAT, local activation velocity, an electrical activity, a topology, a bipolar mapping, a dominant frequency, or an impedance. Data (e.g., biometric data) corresponding to multiple modalities may be captured using a catheter (e.g., the catheter 14) inserted into a patient's body and may be provided for rendering at the same time or at different times based on corresponding settings and/or preferences of the physician 24.

As an example of a first technique, cardiac mapping by the mapping engine 101 may be implemented by sensing an electrical property of heart tissue, for example, LAT, as a function of the precise location within the heart 12. The corresponding data (e.g., biometric data) may be acquired with one or more catheters (e.g., the catheter 14) that are advanced into the heart 12 and that have electrical and location sensors (e.g., the electrodes 26) in their distal tips. As specific examples, location and electrical activity may be initially measured on about 10 to about 20 points on the interior surface of the heart 12. These data points may be generally sufficient to generate by the mapping engine 101 a preliminary reconstruction or map of the cardiac surface to a satisfactory quality. The preliminary map may be combined by the mapping engine 101 with data taken at additional points to generate a more comprehensive map of the heart's electrical activity. In clinical settings, it is not uncommon to accumulate data at 100 or more sites (e.g., several thousand) to generate a detailed, comprehensive map of heart chamber electrical activity. The generated detailed map may then serve as the basis for deciding on a therapeutic course of action, for example, tissue ablation as described herein, to alter the propagation of the heart's electrical activity and to restore normal heart rhythm.

Further, cardiac mapping by the mapping engine 101 can be generated based on detection of intracardiac electrical potential fields (e.g., which is an example of IC ECG data and/or bipolar intracardiac reference signals). A non-contact technique to simultaneously acquire a large amount of cardiac electrical information may be implemented. For example, a catheter type having a distal end portion may be provided with a series of sensor electrodes distributed over its surface and connected to insulated electrical conductors for connection to signal sensing and processing means. The size and shape of the end portion may be such that the electrodes are spaced substantially away from the wall of the cardiac chamber. Intracardiac potential fields may be detected during a single cardiac beat. According to an example, the sensor electrodes may be distributed on a series of circumferences lying in planes spaced from each other. These planes may be perpendicular to the major axis of the end portion of the catheter. At least two additional electrodes may be provided adjacent at the ends of the major axis of the end portion. As a more specific example, the catheter 14 may include four circumferences with eight electrodes spaced equiangularly on each circumference. Accordingly, in this specific implementation, the catheter may include at least 34 electrodes (32 circumferential and 2 end electrodes). As another more specific example, the catheter 14 may include other multi-spline catheters, such as five soft flexible branches, eight radial splines, or a parallel splined pancake turner type (e.g., any of which may have a total of 42 electrodes).

As example of electrical or cardiac mapping, an electrophysiological cardiac mapping system and technique based on a non-contact and non-expanded multi-electrode catheter (e.g., the catheter 14) can be implemented. ECGs may be obtained with one or more catheters 14 having multiple electrodes (e.g., such as between 42 to 122 electrodes). According to this implementation, knowledge of the relative geometry of the probe and the endocardium can be obtained by an independent imaging modality, such as transesophageal echocardiography. After the independent imaging, non-contact electrodes may be used to measure cardiac surface potentials and construct maps therefrom (e.g., in some cases using bipolar intracardiac reference signals). This technique can include the following steps (after the independent imaging step): (a) measuring electrical potentials with a plurality of electrodes disposed on a probe positioned in the heart 12; (b) determining the geometric relationship of the probe surface and the endocardial surface and/or other reference; (c) generating a matrix of coefficients representing the geometric relationship of the probe surface and the endocardial surface; and (d) determining endocardial potentials based on the electrode potentials and the matrix of coefficients.

As another example of electrical or cardiac mapping, a technique and apparatus for mapping the electrical potential distribution of a heart chamber can be implemented. An intra-cardiac multi-electrode mapping catheter assembly can be inserted into the heart 12. The mapping catheter (e.g., the catheter 14) assembly can include a multi-electrode array with one or more integral reference electrodes (e.g., one or the electrodes 26) or a companion reference catheter.

According to one or more embodiments, the electrodes may be deployed in the form of a substantially spherical array, which may be spatially referenced to a point on the endocardial surface by the reference electrode or by the reference catheter this is brought into contact with the endocardial surface. The preferred electrode array catheter may carry a number of individual electrode sites (e.g., at least 24). Additionally, this example technique may be implemented with knowledge of the location of each of the electrode sites on the array, as well as knowledge of the cardiac geometry. These locations are preferably determined by a technique of impedance plethysmography.

In view of electrical or cardiac mapping and according to another example, the catheter 14 can be a heart mapping catheter assembly that may include an electrode array defining a number of electrode sites. The heart mapping catheter assembly can also include a lumen to accept a reference catheter having a distal tip electrode assembly that may be used to probe the heart wall. The map heart mapping catheter assembly can include a braid of insulated wires (e.g., having 24 to 64 wires in the braid), and each of the wires may be used to form electrode sites. The heart mapping catheter assembly may be readily positionable in the heart 12 to be used to acquire electrical activity information from a first set of non-contact electrode sites and/or a second set of in-contact electrode sites.

Further, according to another example, the catheter 14 that can implement mapping electrophysiological activity within the heart 12 can include a distal tip that is adapted for delivery of a stimulating pulse for pacing the heart 12 or an ablative electrode for ablating tissue in contact with the tip. This catheter 14 can further include at least one pair of orthogonal electrodes to generate a difference signal indicative of the local cardiac electrical activity adjacent the orthogonal electrodes.

As noted herein, the system 10 can be utilized to detect, diagnose, and/or treat cardiac conditions. In example operation, a process for measuring electrophysiologic data in a heart chamber may be implemented by the system 10. The process may include, in part, positioning a set of active and passive electrodes into the heart 12, supplying current to the active electrodes, thereby generating an electric field in the heart chamber, and measuring the electric field at the passive electrode sites. The passive electrodes are contained in an array positioned on an inflatable balloon of a balloon catheter. In preferred embodiments, the array is said to have from 60 to 64 electrodes.

As another example operation, cardiac mapping may be implemented by the system 10 using one or more ultrasound transducers. The ultrasound transducers may be inserted into a patient's heart 12 and may collect a plurality of ultrasound slices (e.g., two dimensional or 3D slices) at various locations and orientations within the heart 12. The location and orientation of a given ultrasound transducer may be known and the collected ultrasound slices may be stored such that they can be displayed at a later time. One or more ultrasound slices corresponding to the position of the catheter 14 (e.g., a treatment catheter) at the later time may be displayed and the catheter 14 may be overlaid onto the one or more ultrasound slices.

In view of the system 10, it is noted that cardiac arrhythmias, including atrial arrhythmias, may be of a multiwavelet reentrant type, characterized by multiple asynchronous loops of electrical impulses that are scattered about the atrial chamber and are often self-propagating (e.g., another example of the IC ECG data). Alternatively, or in addition to the multiwavelet reentrant type, cardiac arrhythmias may also have a focal origin, such as when an isolated region of tissue in an atrium fires autonomously in a rapid, repetitive fashion (e.g., another example of the IC ECG data). Ventricular tachycardia (V-tach or VT) is a tachycardia, or fast heart rhythm that originates in one of the ventricles of the heart. This is a potentially life-threatening arrhythmia because it may lead to ventricular fibrillation and sudden death.

For example, aFib occurs when the normal electrical impulses (e.g., another example of the IC ECG data) generated by the sinoatrial node are overwhelmed by disorganized electrical impulses (e.g., signal interference) that originate in the atria veins and PVs causing irregular impulses to be conducted to the ventricles. An irregular heartbeat results, and may last from minutes to weeks, or even years. aFib is often a chronic condition that leads to a small increase in the risk of death, often due to strokes. A line of treatment for aFib is medication that either slows the heart rate or revert the heart rhythm back to normal. Additionally, persons with aFib are often given anticoagulants to protect them from the risk of stroke. The use of such anticoagulants comes with its own risk of internal bleeding. In some patients, medication is not sufficient and their aFib is deemed to be drug-refractory, i.e., untreatable with standard pharmacological interventions. Synchronized electrical cardioversion may also be used to convert aFib to a normal heart rhythm. Alternatively, aFib patients are treated by catheter ablation.

A catheter ablation-based treatment may include mapping the electrical properties of heart tissue, especially the endocardium and the heart volume, and selectively ablating cardiac tissue by application of energy. Electrical or cardiac mapping (e.g., implemented by any electrophysiological cardiac mapping system and technique described herein) includes creating a map of electrical potentials (e.g., a voltage map) of the wave propagation along the heart tissue or a map of arrival times (e.g., a LAT map) to various tissue located points. Electrical or cardiac mapping (e.g., a cardiac map) may be used for detecting local heart tissue dysfunction. Ablations, such as those based on cardiac mapping, can cease or modify the propagation of unwanted electrical signals from one portion of the heart 12 to another.

The ablation process damages the unwanted electrical pathways by formation of non-conducting lesions. Various energy delivery modalities have been disclosed for forming lesions, and include use of microwave, laser and more commonly, radiofrequency energies to create conduction blocks along the cardiac tissue wall. Another example of an energy delivery technique includes irreversible electroporation (IRE), which provides high electric fields that damage cell membranes. For instance, the system 10 estimates an intensity in a vicinity of an ablation based on IRE, which can have a more local effect than RF. In a two-step procedure (e.g., mapping followed by ablation) electrical activity at points within the heart 12 is typically sensed and measured by advancing the catheter 14 containing one or more electrical sensors (e.g., electrodes 26) into the heart 12 and obtaining/acquiring data at a multiplicity of points (e.g., as biometric data generally, or as ECG data specifically). This ECG data is then utilized to select the endocardial target areas, at which ablation is to be performed.

Cardiac ablation and other cardiac electrophysiological procedures have become increasingly complex as clinicians treat challenging conditions such as atrial fibrillation and ventricular tachycardia. The treatment of complex arrhythmias can now rely on the use of 3D mapping systems to reconstruct the anatomy of the heart chamber of interest. In this regard, the mapping engine 101 employed by the system 10 herein manipulates and evaluates the biometric data generally, or the ECG data specifically, to produce improved tissue data that enables more accurate diagnosis, images, scans, and/or maps for treating an abnormal heartbeat or arrhythmia. For example, cardiologists rely upon software, such as the Complex Fractionated Atrial Electrograms (CFAE) module of the CARTO® 3 3D mapping system, produced by Biosense Webster, Inc. (Diamond Bar, CA), to generate and analyze ECG data. The mapping engine 101 of the system 10 enhances this software to generate and analyze the improved biometric data, which further provide multiple pieces of information regarding electrophysiological properties of the heart 12 (including the scar tissue) that represent cardiac substrates (anatomical and functional) of aFib.

Accordingly, the system 10 can implement a 3D mapping system, such as CARTO® 3 3D mapping system, to localize the potential arrhythmogenic substrate of the cardiomyopathy in terms of abnormal ECG detection. The substrate linked to these cardiac conditions is related to the presence of fragmented and prolonged ECGs in the endocardial and/or epicardial layers of the ventricular chambers (right and left). For instance, areas of low or medium voltage may exhibit ECG fragmentation and prolonged activities. Further, during sinus rhythm, areas of low or medium voltage may corresponds to a critical isthmus identified during sustained and organized ventricular arrhythmias (e.g., applies to non-tolerated ventricular tachycardias, as well as in the atria). In general, abnormal tissue is characterized by low-voltage ECGs. However, initial clinical experience in endo-epicardial mapping indicates that areas of low-voltage are not always present as the sole arrhythmogenic mechanism in such patients. In fact, areas of low or medium voltage may exhibit ECG fragmentation and prolonged activities during sinus rhythm, which corresponds to the critical isthmus identified during sustained and organized ventricular arrhythmias, e.g., applies only to non-tolerated ventricular tachycardias. Moreover, in many cases, ECG fragmentation and prolonged activities are observed in the regions showing a normal or near-normal voltage amplitude (>1-1.5 mV). Although the latter areas may be evaluated according to the voltage amplitude, they cannot be considered as normal according to the intracardiac signal, thus representing a true arrhythmogenic substrate. The 3D mapping may be able to localize the arrhythmogenic substrate on the endocardial and/or epicardial layer of the right/left ventricle, which may vary in distribution according to the extension of the main disease.

As another example operation, cardiac mapping may be implemented by the system 10 using one or more multiple-electrode catheters (e.g., the catheter 14). Multiple-electrode catheters are used to stimulate and map electrical activity in the heart 12 and to ablate sites of aberrant electrical activity. In use, the multiple-electrode catheter is inserted into a major vein or artery, e.g., femoral vein, and then guided into the chamber of the heart 12 of concern. A typical ablation procedure involves the insertion of the catheter 14 having at least one electrode 26 at its distal end, into a heart chamber. A reference electrode is provided, taped to the skin of the patient or by means of a second catheter that is positioned in or near the heart or selected from one or the other electrodes 26 of the catheter 14. RF current is applied to a tip electrode 26 of the ablating catheter 14, and current flows through the media that surrounds it (e.g., blood and tissue) toward the reference electrode. The distribution of current depends on the amount of electrode surface in contact with the tissue as compared to blood, which has a higher conductivity than the tissue. Heating of the tissue occurs due to its electrical resistance. The tissue is heated sufficiently to cause cellular destruction in the cardiac tissue resulting in formation of a lesion within the cardiac tissue which is electrically non-conductive. During this process, heating of the tip electrode 26 also occurs as a result of conduction from the heated tissue to the electrode itself. If the electrode temperature becomes sufficiently high, possibly above 60 degrees Celsius, a thin transparent coating of dehydrated blood protein can form on the surface of the electrode 26. If the temperature continues to rise, this dehydrated layer can become progressively thicker resulting in blood coagulation on the electrode surface. Because dehydrated biological material has a higher electrical resistance than endocardial tissue, impedance to the flow of electrical energy into the tissue also increases. If the impedance increases sufficiently, an impedance rise occurs, and the catheter 14 must be removed from the body and the tip electrode 26 cleaned.

According to an example, with respect to obtaining the biometric data, a multi-electrode catheter (e.g., the catheter 14) can be advanced into a chamber of the heart 12. Anteroposterior (AP) and lateral fluorograms can be obtained to establish the position and orientation of each of the electrodes. ECGs can be recorded from each of the electrodes 26 in contact with a cardiac surface relative to a temporal reference, such as the onset of the P-wave in sinus rhythm from a BS ECG and/or signals from electrodes 26 of the catheter 14 placed in the coronary sinus. The system 10, as further disclosed herein, may differentiate between those electrodes that register electrical activity and those that do not due to absence of close proximity to the endocardial wall. After initial ECGs are recorded, the catheter may be repositioned, and fluorograms and ECGs may be recorded again. An electrical map (e.g., via cardiac mapping) can then be constructed from iterations of the process above.

Figure 2:
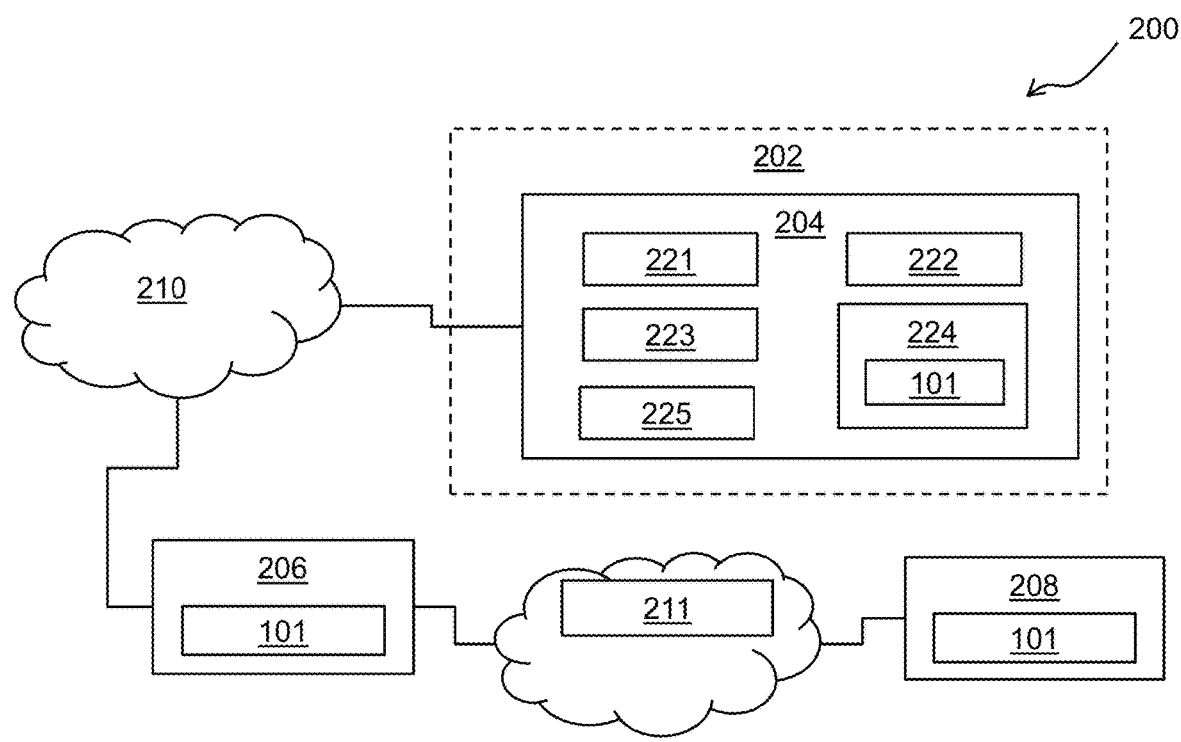
FIG. 2 depicts a system according to one or more embodiments.

Turning now to FIG. 2, a diagram of a system 200 in which one or more features of the disclosure subject matter can be implemented is illustrated according to one or more exemplary embodiments. The system 200 includes, in relation to a patient 202 (e.g., an example of the patient 23 of FIG. 1), an apparatus 204, a local computing device 206, a remote computing system 208, a first network 210, and a second network 211. Further, the apparatus 204 can include a biometric sensor 221 (e.g., an example of the catheter 14 of FIG. 1), a processor 222, a user input (UI) sensor 223, a memory 224, and a transceiver 225. Note that the mapping engine 101 of FIG. 1 is reused in FIG. 2 for ease of explanation and brevity.

According to an embodiment, the apparatus 204 can be an example of the system 10 of FIG. 1, where the apparatus 204 can include both components that are internal to the patient 202 and components that are external to the patient 202. According to another embodiment, the apparatus 204 can be an apparatus that is external to the patient 202 that includes an attachable patch (e.g., that attaches to a patient's skin). According to another embodiment, the apparatus 204 can be internal to a body of the patient 202 (e.g., subcutaneously implantable), where the apparatus 204 can be inserted into the patient 202 via any applicable manner including orally injecting, surgical insertion via a vein or artery, an endoscopic procedure, or a laparoscopic procedure. According to an embodiment, while a single apparatus 204 is shown in FIG. 2, example systems may include a plurality of apparatuses.

Accordingly, the apparatus 204, the local computing device 206, and/or the remote computing system 208 can be programed to execute computer instructions with respect the mapping engine 101. As an example, the memory 224 stores these instructions for execution by the processor 222 so that the apparatus 204 can receive and process the biometric data via the biometric sensor 201. In this way, the processor 222 and the memory 224 are representative of processors and memories of the local computing device 206 and/or the remote computing system 208.

The apparatus 204, local computing device 206, and/or the remote computing system 208 can be any combination of software (e.g., processor executable code) and/or hardware that individually or collectively store, execute, and implement the mapping engine 101 and functions thereof. Further, the apparatus 204, local computing device 206, and/or the remote computing system 208 can be an electronic, computer framework comprising and/or employing any number and combination of computing device and networks utilizing various communication technologies, as described herein. The apparatus 204, local computing device 206, and/or the remote computing system 208 can be easily scalable, extensible, and modular, with the ability to change to different services or reconfigure some features independently of others.

The networks 210 and 211 can be a wired network, a wireless network, or include one or more wired and wireless networks. According to an embodiment, the network 210 is an example of a short-range network (e.g., local area network (LAN), or personal area network (PAN)). Information can be sent, via the network 210, between the apparatus 204 and the local computing device 206 using any one of various short-range wireless communication protocols, such as Bluetooth, Wi-Fi, Zigbee, Z-Wave, near field communications (NFC), ultra-band, Zigbee, or infrared (IR). Further, the network 211 is an example of one or more of an Intranet, a local area network (LAN), a wide area network (WAN), a metropolitan area network (MAN), a direct connection or series of connections, a cellular telephone network, or any other network or medium capable of facilitating communication between the local computing device 206 and the remote computing system 208. Information can be sent, via the network 211, using any one of various long-range wireless communication protocols (e.g., TCP/IP, HTTP, 3G, 4G/LTE, or 5G/New Radio). Note that for either network 210 and 211 wired connections can be implemented using Ethernet, Universal Serial Bus (USB), RJ-11 or any other wired connection and wireless connections can be implemented using Wi-Fi, WiMAX, and Bluetooth, infrared, cellular networks, satellite or any other wireless connection methodology.

In operation, the apparatus 204 can continually or periodically obtain, monitor, store, process, and communicate via network 210 the biometric data associated with the patient 202. Further, the apparatus 204, local computing device 206, and/the remote computing system 208 are in communication through the networks 210 and 211 (e.g., the local computing device 206 can be configured as a gateway between the apparatus 204 and the remote computing system 208). For instance, the apparatus 204 can be an example of the system 10 of FIG. 1 configured to communicate with the local computing device 206 via the network 210. The local computing device 206 can be, for example, a stationary/standalone device, a base station, a desktop/laptop computer, a smart phone, a smartwatch, a tablet, or other device configured to communicate with other devices via networks 211 and 210. The remote computing system 208, implemented as a physical server on or connected to the network 211 or as a virtual server in a public cloud computing provider (e.g., Amazon Web Services (AWS)®) of the network 211, can be configured to communicate with the local computing device 206 via the network 211. Thus, the biometric data associated with the patient 202 can be communicated throughout the system 200.

Elements of the apparatus 204 are now described. The biometric sensor 221 may include, for example, one or more transducers configured to convert one or more environmental conditions into an electrical signal, such that different types of biometric data are observed/obtained/acquired. For example, the biometric sensor 221 can include one or more of an electrode (e.g., the electrodes 18 and 26 of FIG. 1), a temperature sensor (e.g., thermocouple), a blood pressure sensor, a blood glucose sensor, a blood oxygen sensor, a pH sensor, an accelerometer, and a microphone.

The processor 222, in executing the mapping engine 101, can be configured to receive, process, and manage the biometric data acquired by the biometric sensor 221, and communicate the biometric data to the memory 224 for storage and/or across the network 210 via the transceiver 225. Biometric data from one or more other apparatuses 204 can also be received by the processor 222 through the transceiver 225. Also, as described in more detail herein, the processor 222 may be configured to respond selectively to different tapping patterns (e.g., a single tap or a double tap) received from the UI sensor 223, such that different tasks of a patch (e.g., acquisition, storing, or transmission of data) can be activated based on the detected pattern. In some embodiments, the processor 222 can generate audible feedback with respect to detecting a gesture.

The UI sensor 223 includes, for example, a piezoelectric sensor or a capacitive sensor configured to receive a user input, such as a tapping or touching. For example, the UI sensor 223 can be controlled to implement a capacitive coupling, in response to tapping or touching a surface of the apparatus 204 by the patient 202. Gesture recognition may be implemented via any one of various capacitive types, such as resistive capacitive, surface capacitive, projected capacitive, surface acoustic wave, piezoelectric and infrared touching. Capacitive sensors may be disposed at a small area or over a length of the surface, such that the tapping or touching of the surface activates the monitoring device.

The memory 224 may be any non-transitory tangible media, such as magnetic, optical, or electronic memory (e.g., any suitable volatile and/or non-volatile memory, such as random-access memory or a hard disk drive). The memory 224 stores the computer instructions for execution by the processor 222.

The transceiver 225 may include a separate transmitter and a separate receiver. Alternatively, the transceiver 225 may include a transmitter and receiver integrated into a single device.

In operation, the apparatus 204, utilizing the mapping engine 101, observes/obtains the biometric data of the patient 202 via the biometric sensor 221, stores the biometric data in the memory, and shares this biometric data across the system 200 via the transceiver 225. The mapping engine 101 can then utilize models, neural networks, and ML/AI algorithms to extract and analyze electrical activity and to provide medical professionals with detailed cardiac vein ablation visualization using at least 3D maps of the interior and exterior of the heart that are otherwise not currently available and that improve efficiency and success of cardiac procedures.

Figure 3:
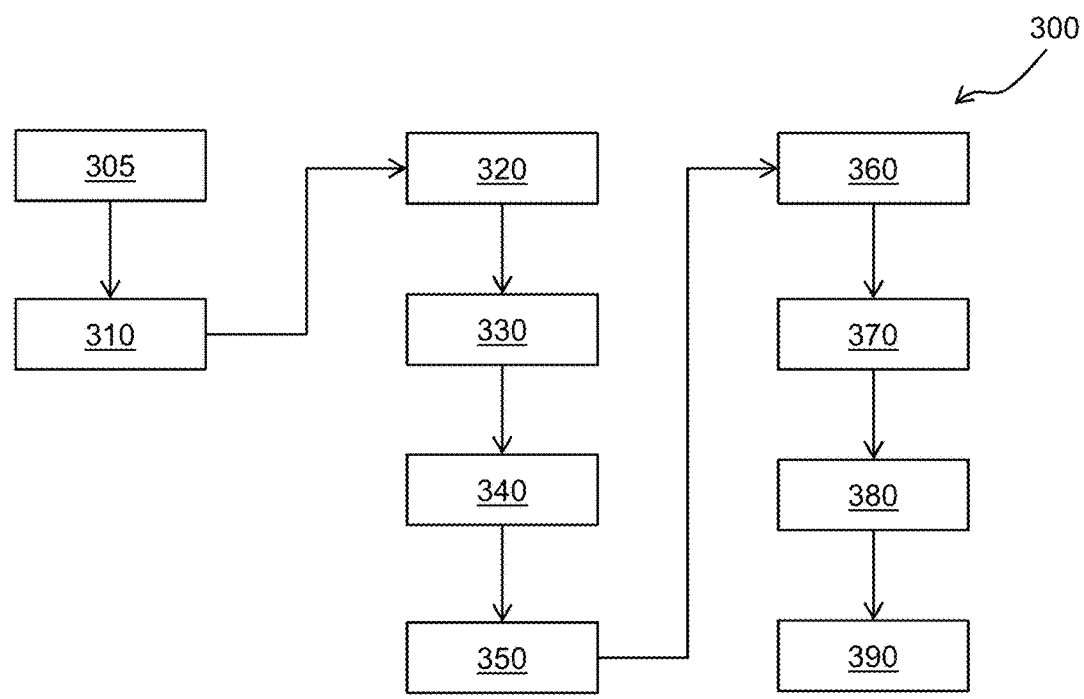
FIG. 3 depicts a method according to one or more embodiments.

Turning now to FIG. 3, a method 300 (e.g., performed by the mapping engine 101 of FIG. 1 and/or of FIG. 2) is illustrated according to one or more exemplary embodiments. According to one or more embodiments, the method 300 as implemented by the mapping engine 100 (i.e., during process operation of the system 10 of FIG. 1 and/or the system 200 of FIG. 2) implements a multi-step manipulation of the electrical activity (of the heart 12 of FIG. 1 or the patient 202 of FIG. 2) to generate detailed cardiac vein ablation visualizations that address a crudeness of conventional 3D images and visual clutter by annotations thereon. One or more advantages, technical effects, and/or benefits of the method 300 include providing medical professionals with an improved understanding an electrophysiology with more precision that furthers efficiency and success of cardiac procedures. According to one or more embodiments, the method 300 can be implemented by the mapping engine 101 with any IRE, such as PFA.

The method begins at block 305, where the mapping engine 101 acquires biometric data. The biometric data can be acquired by the mapping engine 101 in real time. The biometric data can be acquired by the mapping engine 101 from a device. The device can be any medical or surgical devices, such as the catheter 14. In this regard, the biometric data can be acquired by the mapping engine 101 from the catheter 14, in real time, as the catheter 14 advances into the heart 12. The electrical signals can be generated by electrical and location sensors (e.g., the electrodes 26) in one or more distal tips, one or more proximate ends, and therebetween. Further, the biometric data can be acquired by the mapping engine 101 based on detection of intracardiac electrical potential fields (e.g., IC ECG data and/or bipolar intracardiac reference signals) and/or a non-contact technique to simultaneously acquire a large amount of cardiac electrical information. The biometric data can also be acquired from historical data of past procedures stored in the memory 62 or database connected to the workstation 55.

At block 310, the mapping engine 101 analyzes and evaluates the biometric data. According to one or more embodiments, the mapping engine 101 utilizes the biometric data to generate one or more 3D anatomical models. The one or more 3D anatomical models can be at least a portion of an anatomical feature. The anatomical feature can include heart 12. The portion of the anatomical feature can include a vein of an atria of heart 12. The one or more 3D anatomical models are generated from one or more electrical layers constructed from iterations of advancing the catheter 14, as described in block 305 (e.g., constructed by cardiac mapping).

According to one or more embodiments, the mapping engine 101 generates/produces a 3D anatomical model. Further, the mapping engine 101 can also generate one or more topological maps. The one or more topological maps can include topographical views of the 3D anatomical model. The one or more topological maps can be from one or more distances and/or one or more perspectives. The one or more perspectives include a view from an exterior of a vein of an atria and/or the heart 12. The one or more perspectives include a view from a proximate end to distal end. The one or more perspectives include a view from the distal end to the proximate end. The one or more topographical maps comprising at least one external map view.

According to one or more embodiments, the mapping engine 101 includes and utilizes models, neural networks, and ML/AI algorithms to analyze and evaluate the biometric data to produced/generate, as well as refine, the one or more 3D anatomical models. The mapping engine 101 generates 3D data based on ultrasonic-based localization system, catheter positions, or imported CT, and refines the one or more 3D anatomical models using the 3D data. For example, the mapping engine 101 operates the ML/AI algorithms with neural networks therein. In general, a neural network is a network or circuit of neurons, or in a modern sense, an artificial neural network (ANN), composed of artificial neurons or nodes or cells. According to one or more embodiments, the neural network can implement a long short-term memory neural network architecture, a convolutional neural network (CNN) architecture, or other the like. The neural network can be configurable with respect to a number of layers, a number of connections (e.g., encoder/decoder connections), a regularization technique (e.g., dropout); and an optimization feature.

At block 320, the mapping engine 101 generates a graphical user interface (GUI). The GUI can be a form of user interface that allows users to interact with the biometric data through graphical icons, audio indicator, 3D anatomical models, etc. According to one or more embodiments, the mapping engine 101 generates an output to the GUI. The GUI can include one or more frames, windows, portions, each of which can operate simultaneously or independently and present the output. The output can include one or more topological maps. The mapping engine 101 implements a multi-step manipulation of the electrical activity of the heart, the biometric data, the ultrasonic-based localization system, the catheter positions, and imported CT to generate the detailed cardiac vein ablation visualizations with in the GUI that provide medical professionals with an improved understanding an electrophysiology with more precision that furthers efficiency and success of cardiac procedures.

According to one or more embodiments, the GUI can include one or more frames providing one or more topological maps constructed from the 3D anatomical model of the portion of the anatomical feature. The one or more topological maps can include at least one interior map view of the portion of the anatomical feature from the perspective of the device. The perspective of the device includes a view from a perspective of the catheter 14. The perspective of the device includes a view from a perspective of a proximate end to a distal end of the catheter 14. The perspective of the device includes a view from a perspective of the distal end to the proximate end of the catheter 14. The one or more topological maps can include at least one external map view.

Figure 4:
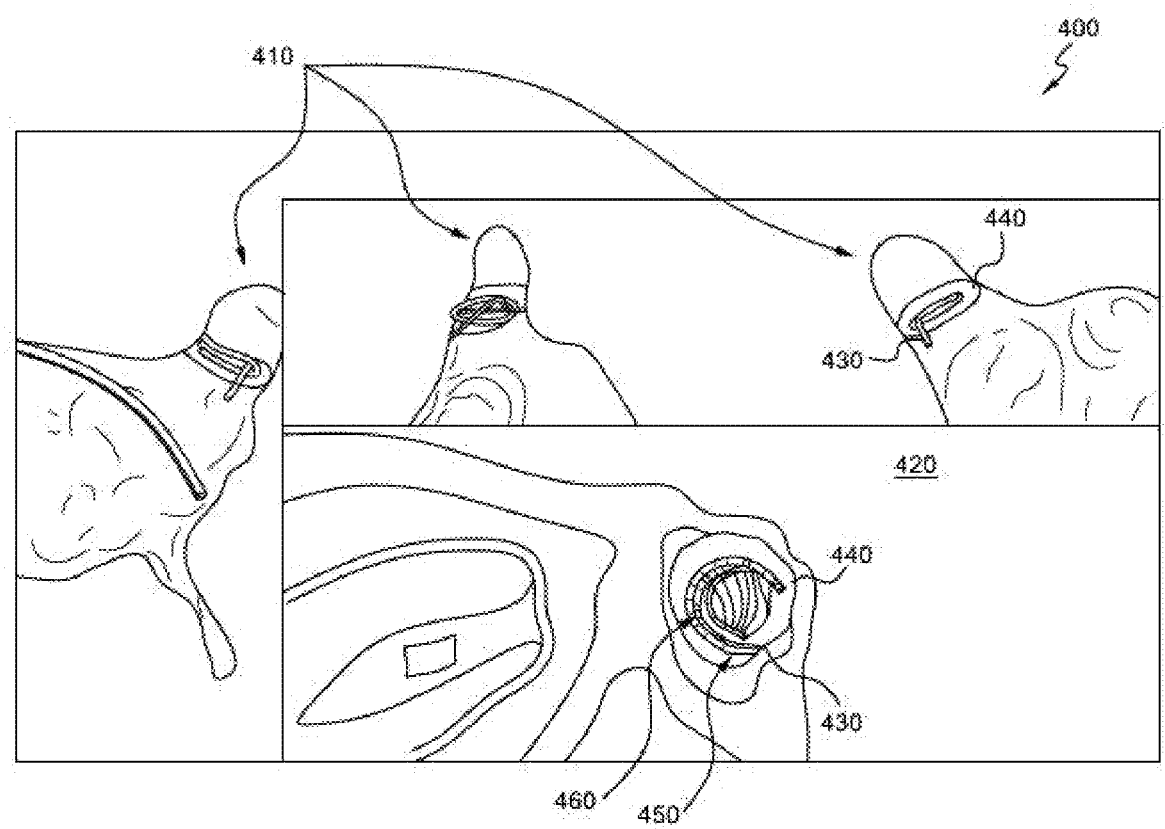
FIG. 4 depict an interface according to one or more embodiments.
Figure 4:
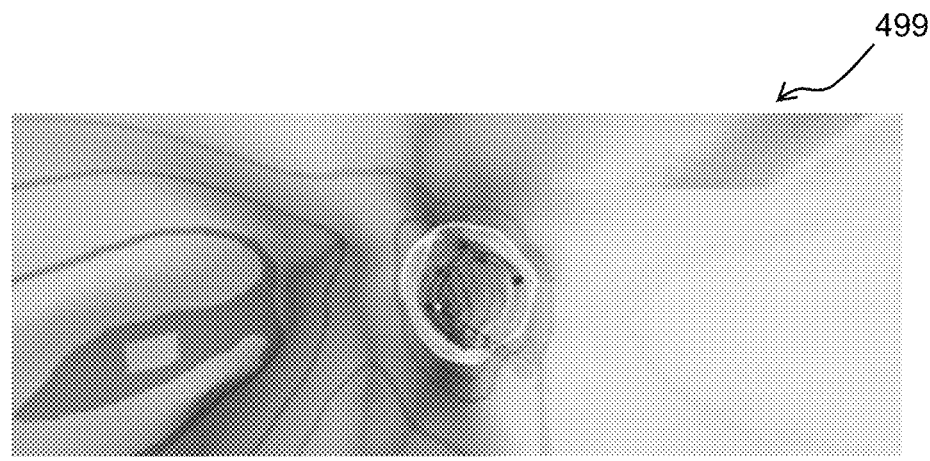

Turning to FIG. 4, an interface 400 is depicted according to one or more embodiments. The interface 400 is an example of the GUI generated by the mapping engine 101. The interface 400 shows exterior views 410 and an interior view 420 of the 3D anatomical model with interface elements therein. Note that there are three exterior views 410 showing different perspectives of the 3D anatomical model and note that the interior view 420 can be a topological view from within the atrium. According to one or more embodiments, a device icon 430, a cloud 440, a tint 450, and an identifiers 460 of the interface 400 are example of interface elements of the GUI. Each of these examples can be color-coded, include variations in transparency, be associated with line or texture gradients, etc. to distinguish and/or show aspects of the one or more topological. According to one or more embodiments, the interior view 420 is shown in a black and white example 499, which further depicts shading, texture, etc. The example 499 can also be produced in color by the mapping engine 101.

Returning to FIG. 3, at block 330, the mapping engine 101 generates a device icon. The mapping engine 101 utilizes IRE, such as a PFA, to generate the device icon. The mapping engine 101 present the device icon on each of the one or more topological maps. The device icon presents a real time position of an ablating surface of the device (i.e., the catheter 14) in relation to each map view of the one or more topological maps. The device icon can include, but is not limited to, an interface element identifier in a shape of the catheter 14 with demarcations (i.e., identifiers 460) representing the electrodes 26. As shown in FIG. 4, the interface 400 presents the device icon 430, which can be a three-dimensional representation of catheter (i.e., an replica corresponding to size and shape) or a catheter icon. For instance, demarcations or the identifiers 460 for each of the one or more electrodes 25 can be a highlighted area along a representation of the device icon 430.

At block 340, the mapping engine 101 generates a cloud. The cloud can be generated on each of the one or more topological maps. The cloud indicates at least one ablation area based on a position of an ablating surface. For instance, the cloud is a real time indication of the at least one ablation area based on the real time position of the ablating surface. As shown in FIG. 4, the interface 400 presents the cloud 440, which can indicate an affected area.

At block 350, the mapping engine 101 generates a tint inside the cloud. The tint indicates one or more parameters. According to one or more embodiments, the one or more parameters can include at least an intensity of an ablation (e.g., wherein the intensity can be calculated by the mapping engine 101) or number of ablations delivered. According to one or more embodiments, the tint is produced by various ablation parameters including, but not limited to, a distance from a source of ablation, ablation duration, number of ablations within the same area, intensity of the ablation, and tissue proximity indicator (TPI) value. The TPI value is a result of a calculation determination by the mapping engine 101 (such as a TIP algorithm, an impedance-based determination, or the like) to detect catheter proximity to tissue. As shown in FIG. 4, the interface 400 presents the tint 450 within the cloud 440. Note that the tint can be a mixture of a color with white to increase lightness or black to increase darkness, both of which affect a resulting color mixture's relative saturation.

At block 360, the mapping engine 101 generates identifiers. For example, in real time, the mapping engine 101 generates an identifier for each electrode of the plurality of electrodes (e.g., the electrodes 26) in contact with tissue of the portion of the anatomical feature. For instance, the contact can be effective contact. Effective contact can include actual physical contact with the tissue. Effective contact can also include proximity to the tissue. According to one or more embodiment, the mapping engine 101 can utilize a TPI algorithm to generate proximity to tissue of the vein. TPI algorithm indicates, according to impedance changes, whether an electrode 26 touches the tissue or not, which is incorporated into in the mapping engine 101 and/or adds an indication on to the GUI with respect to the electrode 26 or a catheter shaft. As shown in FIG. 4, the interface 400 presents the identifiers 460.

At block 370, the mapping engine 101 presents the GUI on the display device 27. For instance, the interface 400 can be shown by the display device 27.

At block 380, the mapping engine 101 monitors a position of an ablating surface of the device. The mapping engine 101 monitors a real time position of an ablating surface of the catheter 14.

At block 390, the mapping engine 101 updates the one or more topological maps based on the position. The mapping engine 101, in real time, updates the one or more topological maps based on the real time position of the ablating surface of the catheter 14. For instance, the tint can be updated in real time during ablation.

Figure 5:
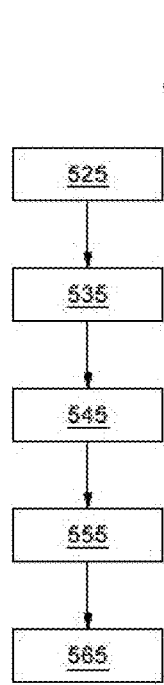
FIG. 5 depict an interface according to one or more embodiments.

FIG. 5 depicts a method 500 according to one or more embodiments. FIGS. 6-10 present interfaces 600, 700, 800, 900, and 1000 depicting a catheter 601 (i.e., the catheter 14) moving into a vein 602 (i.e., of the heart 12) according to one or more embodiments. The method 500 describes operations of the mapping engine 101 with respect to the interfaces 600, 700, 800, 900, and 1000. FIGS. 5-10 are described in conjunction.

Figure 6:
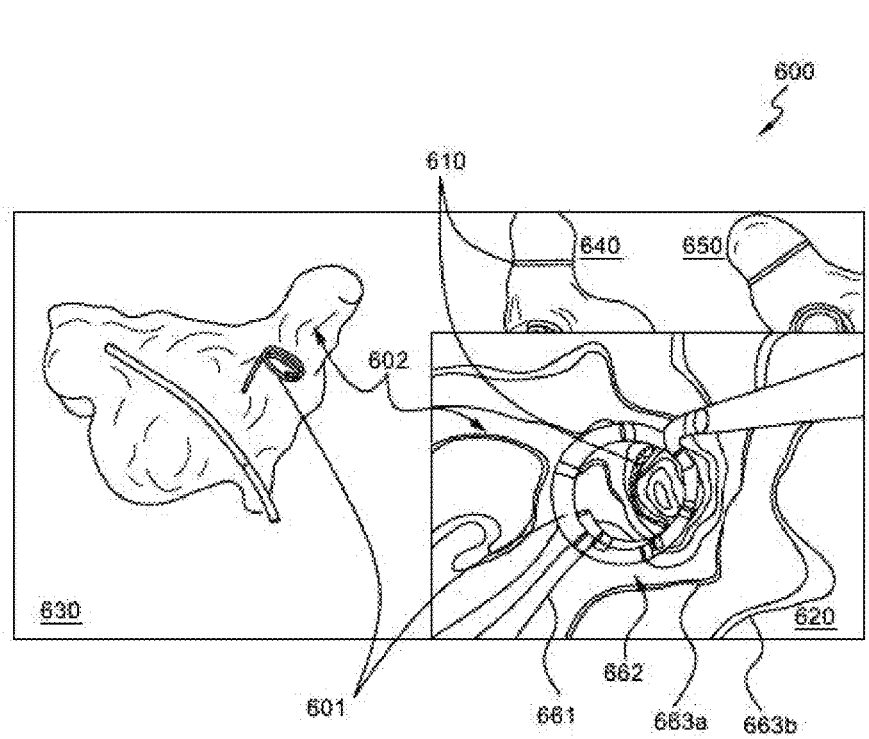
FIG. 6 depict an interface according to one or more embodiments.
Figure 7:
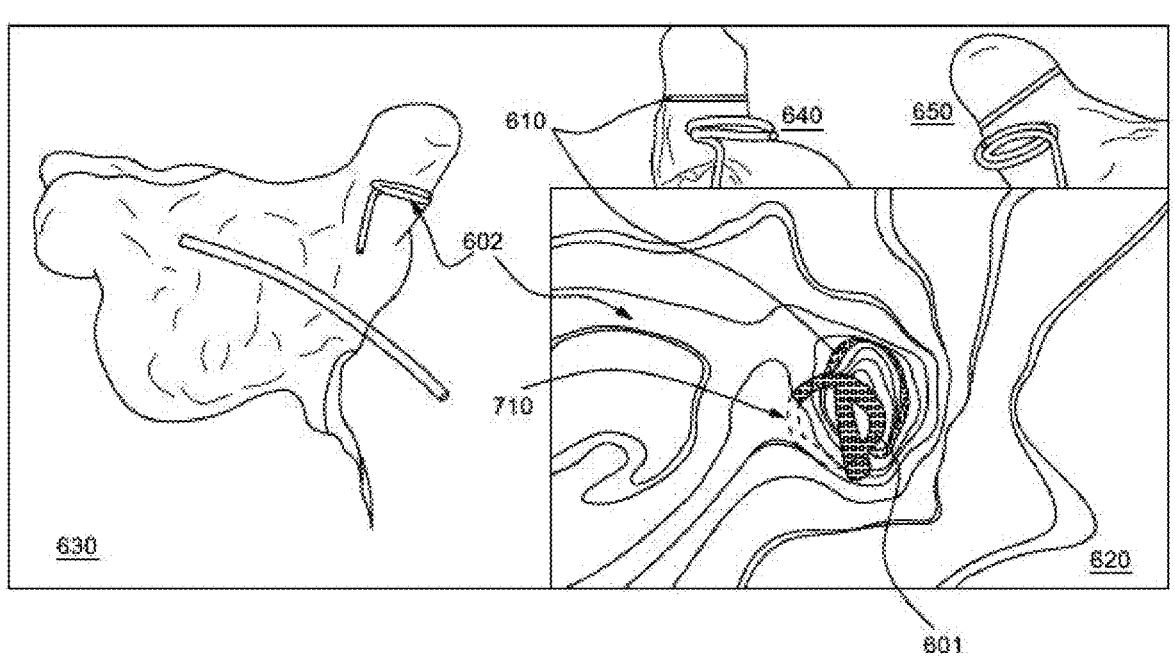
FIG. 7 depict an interface according to one or more embodiments.
Figure 8:
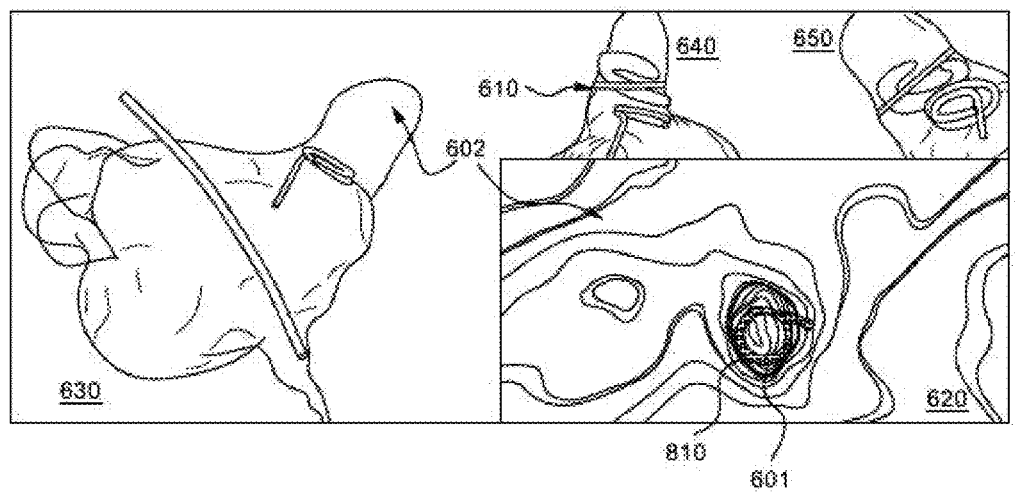
FIG. 8 depict an interface according to one or more embodiments.
Figure 9:
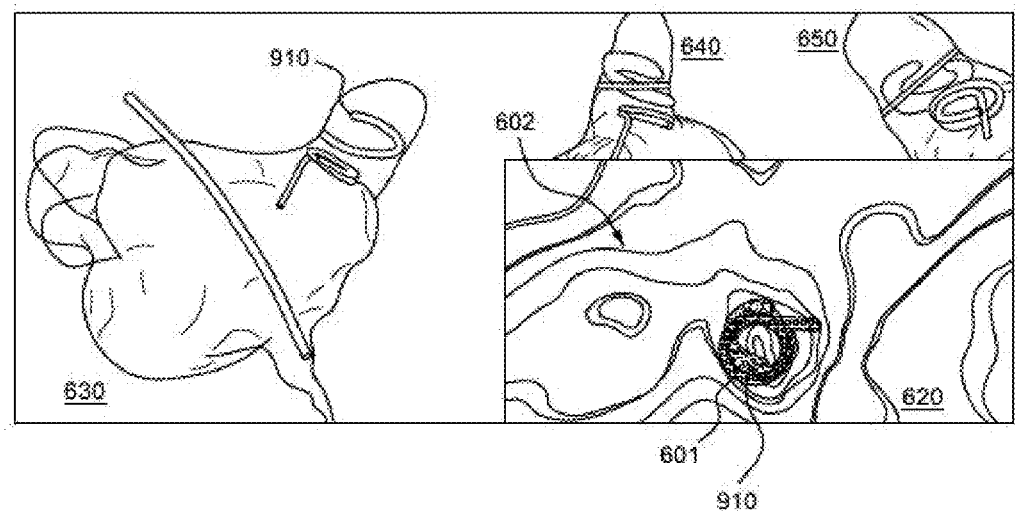
FIG. 9 depict an interface according to one or more embodiments.
Figure 10:
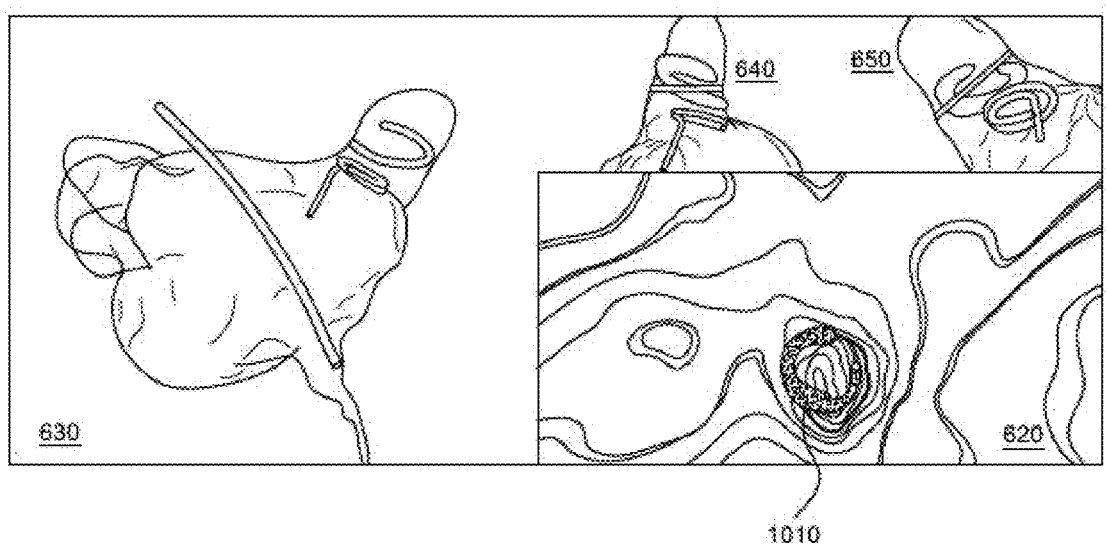
FIG. 10 depict an interface according to one or more embodiments.

At block 525, the mapping engine 101 detects the catheter 14 and a topology of the heart 12. The mapping engine 101 presents the catheter 14 and topologies within the GUI accordingly. FIG. 6 is a snapshot demonstrating that the catheter 601 is within the vein 620 with respect to an ablation target 610 and topological maps 620, 630, 640, and 650. For example, each topological map 620, 630, 640, and 650 can be within a frame of the interface 600. Each topological map 620, 630, 640, and 650 can be independently manipulated. All topological maps 620, 630, 640, and 650 can be collectively manipulated. Further, movements of any interface elements of the interface 600 can also be synchronized the topological maps 620, 630, 640, and 650. The topological map 620 depicts an interior of the vein 602. That is, the topological map 620 presents an interior view of a 3D anatomical model of the vein 602 (i.e., directly showing interior walls 661 of a working location, i.e., the ablation target 610). The topological map 620 provides texture and shows depth via shading 662, lines 663, demarcations, etc. on the interior walls, as the catheter 14 moves into the vein 602. For example, based on the signals by the catheter 14 and the topology of the heart 12, the mapping engine 101 can place a first line 663a at a determined distance from a second line 663b. Further, a contrast of the shading 662 can show slope or depth and/or one or more demarcations or lines 663 can be added at predetermined distances, such as at 0.5 millimeter intervals, showing depth. The topological maps 630, 640, and 650 depict exteriors of the vein 602. In this regard, the topological maps 630, 640, and 650 present exterior views of the same 3D anatomical model from different perspectives (i.e., through the walls to the working location).

Each different view for each of the topological maps 630, 640, and 650 can be separated by one or more values (e.g., 120 degrees) to combine to show a full exterior view (e.g., 360 degrees) of the vein 602 across one or more axis (e.g., a horizontal axis and/or vertical axis). Note that the interior view of the topological map 620 can be from the perspective of the device inside the patient 23, such as the catheter 601. By way of example, the interior view of the topological map 620 depicts the perspective of the catheter 601 from a proximate end to a distal end.

At block 535, the mapping engine 101 detects a catheter 14 as the catheter 14 moves towards an ablation target. The mapping engine 101 presents the detected movement within the GUI accordingly. With respect to FIG. 7, the interface 700 shows movement 710 of the catheter 601 further into the vein 602 (e.g., in the direction from the proximate end to the distal end). Note as the movement 710 is shown in the topological map 620, the other topological maps 630, 640, and 650 move correspondingly.

At block 545, the mapping engine 101 detects alignment of the catheter 14 with respect to the ablation target. The mapping engine 101 presents the detected alignment within the GUI accordingly. With respect to FIG. 8, the interface 800 further shows alignment 810 of the catheter 601 with the ablation target 610. Note how a perimeter of the catheter 601 is within the ablation target 610.

At block 555, the mapping engine 101 detects an ablation by the catheter 14 with respect to the ablation target. The mapping engine 101 presents the detected movement within the GUI accordingly. With respect to FIG. 9, the interface 900 further shows a cloud 910 within the working location. The could 910 indicates, in real time, at least one ablation area based on the real time position of the ablating surface.

At block 565, the mapping engine 101 present an intensity of the ablation by the catheter 14 within the GUI. The mapping engine 101 presents the intensity within the GUI accordingly. With respect to FIG. 10, the interface 1000 further shows a cloud 1010, which includes a tint based on ablation intensity, aligned with the ablation target 610 in the topological map 620. Note that this cloud 1010 can be shown as a purple clouded tinted based on the ablation intensity.

According to one or more embodiments, a computing system is provided. The computing system includes a memory storing processor executable code. The computing system includes at least one processor executing the code. The code causes the computing system to generate a graphical user interface that includes one or more topological maps constructed from a three-dimensional anatomical model of a portion of an anatomical feature. The one or more topological maps include at least one interior map view of the portion of the anatomical feature from a perspective of a device inserted into a patient. The code causes the computing system to generate a device icon on each of the one or more topological maps. The device icon presents a real time position of an ablating surface of the device in relation to each map view of the one or more topological maps.

According to one or more embodiments or any of the computing system embodiments herein, the one or more topological maps can include at least one external map view.

According to one or more embodiments or any of the computing system embodiments herein, the at least one processor can execute the code to cause the computing system to generate a cloud on each of the one or more topological maps indicating, in real time, at least one ablation area based on the real time position of the ablating surface.

According to one or more embodiments or any of the computing system embodiments herein, the at least one processor can execute the code to cause the computing system to generate a tint inside the cloud indicating one or more parameters.

According to one or more embodiments or any of the computing system embodiments herein, the one or more parameters can include an intensity of an ablation.

According to one or more embodiments or any of the computing system embodiments herein, the tint can be updated in real time during ablation.

According to one or more embodiments or any of the computing system embodiments herein, the device can include a catheter comprising a plurality of electrodes, and wherein the at least one processor executes the code to cause the computing system to generate, in real time, an identifier for each electrode of the plurality of electrodes in contact with tissue of the portion of the anatomical feature.

According to one or more embodiments or any of the computing system embodiments herein, the at least one processor can execute the code to cause the computing system to monitor the real time position of the ablating surface of the device and update, in real time, the one or more topological maps based on the real time position.

According to one or more embodiments or any of the computing system embodiments herein, the perspective of the device can include a view from a proximate end to a distal end or a view from the distal end to the proximate end.

According to one or more embodiments or any of the computing system embodiments herein, the at least one interior map view can include shading, lines, or demarcations showing texture and depth.

According to one or more embodiments, a mapping engine implemented in processor executable code of medical device equipment is provided. The medical device equipment includes a memory storing the processor executable code and at least one processor executing the processor executable code. The mapping engine executes to generate a graphical user interface. The graphical user interface includes an interior map view presenting a three-dimensional anatomical model of an interior portion of a heart. The interior map comprising lines or shading presenting texture and showing depth of the interior portion. The graphical user interface includes a device icon presenting a real time position of a catheter in relation to the interior portion of the heart.

According to one or more embodiments or any of the computing system embodiments herein, the graphical user interface can include one or more topological maps each presenting an external map view of the heart.

According to one or more embodiments or any of the computing system embodiments herein, the interior map view can provide a perspective from the catheter inserted into the heart.

According to one or more embodiments or any of the computing system embodiments herein, the graphical user interface can include a cloud the interior map view indicating, in real time, at least one ablation area based on the real time position of the catheter.

According to one or more embodiments or any of the computing system embodiments herein, the graphical user interface can include a tint inside a cloud indicating one or more parameters corresponding to an intensity of an ablation.

According to one or more embodiments or any of the computing system embodiments herein, the graphical user interface can include a tint inside a cloud is updated in real time during ablation.

According to one or more embodiments or any of the computing system embodiments herein, the catheter can include a plurality of electrodes. According to one or more embodiments or any of the computing system embodiments herein, the device icon can include an identifier for each electrode of the plurality of electrodes.

According to one or more embodiments or any of the computing system embodiments herein, the mapping engine can monitor the real time position of the catheter and update, in real time, the interior map view based on the real time position.

According to one or more embodiments or any of the computing system embodiments herein, the interior map view can present a view from a proximate end to a distal end or a view from the distal end to the proximate end.

According to one or more embodiments or any of the computing system embodiments herein, the interior map view can present one or more lines at predetermined distances presenting depth.

According to one or more embodiments, a computing system is provided herein. The computing system includes a memory storing processor executable code. The computing system also includes at least one processor. The at least one processor executes the code to cause the computing system to generate a graphical user interface comprising one or more topological maps constructed from a three-dimensional anatomical model of a portion of an anatomical feature. The one or more topological maps includes at least one interior map view of the portion of the anatomical feature from a perspective of a device inserted into a patient. The at least one processor executes the code to cause the computing system to generate a device icon on each of the one or more topological maps. The device icon presents a real time position of an ablating surface of the device in relation to each map view of the one or more topological maps.

According to one or more embodiments or any of the computing system embodiments herein, the anatomical feature can include a heart.

According to one or more embodiments or any of the computing system embodiments herein, the portion can include a vein of an atria of the heart.

According to one or more embodiments or any of the computing system embodiments herein, the one or more topological maps can include at least one external map view.

According to one or more embodiments or any of the computing system embodiments herein, the at least one processor can execute the code to cause the computing system to generate a cloud on each of the one or more topological maps indicating, in real time, at least one ablation area based on the real time position of the ablating surface.

According to one or more embodiments or any of the computing system embodiments herein, the at least one processor can execute the code to cause the computing system to generate a tint inside the cloud indicating one or more parameters.

According to one or more embodiments or any of the computing system embodiments herein, the one or more parameters can include an intensity of an ablation.

According to one or more embodiments or any of the computing system embodiments herein, the tint can be updated in real time during ablation.

According to one or more embodiments or any of the computing system embodiments herein, the device can include a catheter that can include a plurality of electrodes.

According to one or more embodiments or any of the computing system embodiments herein, the at least one processor can execute the code to cause the computing system to generate, in real time, an identifier for each electrode of the plurality of electrodes in effective contact with tissue of the portion of the anatomical feature.

According to one or more embodiments or any of the computing system embodiments herein, the effective contact can include physical contact or proximity.

According to one or more embodiments or any of the computing system embodiments herein, the identifier can include a highlighted area.

According to one or more embodiments or any of the computing system embodiments herein, the at least one processor can execute the code to cause the computing system to monitor the real time position of the ablating surface of the device and update, in real time, the one or more topological maps based on the real time position.

According to one or more embodiments or any of the computing system embodiments herein, the perspective of the device can include a view from a proximate end to a distal end or a view from the distal end to the proximate end.

According to one or more embodiments, the computing system embodiments herein can be implemented as an apparatus, a method, and/or a computer program product.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system for visualizing a treatment device during a cardiac procedure, the system, comprising:
   a communication interface that is communicatively coupled to a sensor configured to collect positional data and electrophysiological data within a cardiac anatomical structure;
   a display;
   a memory; and
   one or more processors that are communicatively coupled to the communication interface and the memory, wherein the one or more processors are collectively configured to:
      generate a graphical user interface comprising one or more topological maps constructed from a three-dimensional anatomical model of a portion of an anatomical feature, the three-dimensional anatomical model being constructed based on sensor data obtained from an intrabody device positioned within the anatomical feature, the sensor data comprising anatomical data and electrophysiological data collected during a medical procedure, wherein the one or more topological maps comprise at least one interior map view of the portion of the anatomical feature from a simulated viewpoint located within a lumen of the anatomical feature and corresponding to a position of the intrabody device; and
      generate a device icon on each of the one or more topological maps, the device icon representing a real-time location and orientation of an ablating surface of the intrabody device within the anatomical feature, the device icon being rendered based on positional tracking data obtained from one or more sensors of the intrabody device.

2. The computing system of claim 1, wherein the one or more topological maps comprising at least one external map view.

3. The computing system of claim 1, wherein the one or more processors are further collectively configured to:
   generate a cloud on each of the one or more topological maps indicating, in real time, at least one ablation area based on the real-time position of the ablating surface.

4. The computing system of claim 3, wherein the one or more processors are further collectively configured to:
   generate a tint inside the cloud indicating one or more parameters.

5. The computing system of claim 4, wherein the one or more parameters comprises an intensity of an ablation.

6. The computing system of claim 4, wherein the tint is updated in real time during ablation.

7. The computing system of claim 1, wherein the intrabody device comprises a catheter comprising a plurality of electrodes, and wherein the one or more processors are further collectively configured to:
generate, in real time, an identifier for each electrode of the plurality of electrodes in contact with tissue of the portion of the anatomical feature.

8. The computing system of claim 1, wherein the one or more processors are further collectively configured to:
monitor the real-time position of the ablating surface of the intrabody device and update, in real time, the one or more topological maps based on the real-time position.

9. The computing system of claim 1, wherein the graphical user interface is rendered from a perspective of the intrabody device and comprises a view from a proximate end to a distal end or a view from the distal end to the proximate end.

10. The computing system of claim 1, wherein the at least one interior map view comprises shading, lines, or demarcations showing texture and depth.

11. A non-transitory computer readable storage medium storing instructions for visualizing a treatment device during a cardiac procedure performed on a heart of a patient, the instructions when collectively executed by one or more processors of a console, cause the console to perform operations including:
generating a graphical user interface comprising one or more topological maps constructed from a three-dimensional anatomical model of a portion of an anatomical feature, the three-dimensional anatomical model being constructed based on sensor data obtained from an intrabody device positioned within the anatomical feature, the sensor data comprising anatomical data and electrophysiological data collected during a medical procedure, wherein the one or more topological maps comprise at least one interior map view of the portion of the anatomical feature from a simulated viewpoint located within a lumen of the anatomical feature and corresponding to a position of the intrabody device; and
generating a device icon on each of the one or more topological maps, the device icon representing a real-time location and orientation of an ablating surface of the intrabody device within the anatomical feature, the device icon being rendered based on positional tracking data obtained from one or more sensors of the intrabody device.

12. The non-transitory computer readable storage medium of claim 11, wherein the graphical user interface comprises one or more topological maps each presenting an external map view of the heart.

13. The non-transitory computer readable storage medium of claim 11, wherein the interior map view provides a perspective from the treatment device inserted into the heart.

14. The non-transitory computer readable storage medium of claim 11, wherein the graphical user interface comprises a cloud the interior map view indicating, in real time, at least one ablation area based on the real-time position of the treatment device.

15. The non-transitory computer readable storage medium of claim 11, wherein the graphical user interface comprises a tint inside a cloud indicating one or more parameters corresponding to an intensity of an ablation.

16. The non-transitory computer readable storage medium of claim 11, wherein the graphical user interface comprises a tint inside a cloud is updated in real time during ablation.

17. The non-transitory computer readable storage medium of claim 11, wherein the treatment device comprises a plurality of electrodes, and wherein the device icon comprises an identifier for each electrode of the plurality of electrodes.

18. The non-transitory computer readable storage medium of claim 11, wherein the operations further include
monitoring the real-time position of the treatment device catheter and updates, in real time, the interior map view based on the real-time position.

19. The non-transitory computer readable storage medium of claim 11, wherein the interior map view presents a view from a proximate end to a distal end or a view from the distal end to the proximate end.

20. The non-transitory computer readable storage medium claim 11, wherein the interior map view presents one or more lines at predetermined distances presenting depth.

* * * * *

UNITED STATES PATENT AND TRADEMARK OFFICE
CERTIFICATE OF CORRECTION

Page 1 of 2

PATENT NO. : 12,458,438 B2
APPLICATION NO. : 17/994722
DATED : November 4, 2025
INVENTOR(S) : Natan Sharon Katz et al.

It is certified that error appears in the above-identified patent and that said Letters Patent is hereby corrected as shown below:

In the Specification

In Column 1, Line 40, delete "do" and insert -- due --, therefor.
In Column 1, Line 50, delete "difficultly" and insert -- difficulty --, therefor.
In Column 2, Line 44, delete "depict" and insert -- depicts --, therefor.
In Column 2, Line 46, delete "depict" and insert -- depicts --, therefor.
In Column 2, Line 48, delete "depict" and insert -- depicts --, therefor.
In Column 2, Line 50, delete "depict" and insert -- depicts --, therefor.
In Column 2, Line 52, delete "depict" and insert -- depicts --, therefor.
In Column 2, Line 54, delete "depict" and insert -- depicts --, therefor.
In Column 2, Line 56, delete "depict" and insert -- depicts --, therefor.
In Column 3, Line 14, delete "understanding an" and insert -- understanding of an --, therefor.
In Column 6, Line 21, delete "such a" and insert -- such as --, therefor.
In Column 7, Line 24, delete "ventricle activity," and insert -- ventricular activity, --, therefor.
In Column 7, Line 51, delete "diagnosis, and treatment" and insert -- diagnose, and treat --, therefor.
In Column 8, Line 64, delete "respect" and insert -- respect to --, therefor.
In Column 9, Line 14, delete "patient 23." and insert -- patient 23). --, therefor.
In Column 12, Line 38, delete "mapping" and insert -- mapping of the --, therefor.
In Column 13, Line 23, delete "atria veins" and insert -- atrial veins --, therefor.
In Column 15, Line 5, delete "one or" and insert -- one of --, therefor.
In Column 16, Line 11, delete "programed" and insert -- programmed --, therefor.
In Column 16, Line 11, delete "respect the" and insert -- respect to the --, therefor.
In Column 16, Line 64, delete "and/the" and insert -- and/or the --, therefor.
In Column 18, Line 21, delete "understanding an" and insert -- understanding of an --, therefor.
In Column 19, Lines 37-38, delete "understanding an" and insert -- understanding of an --, therefor.
In Column 20, Line 41, delete "determination" and insert -- determined --, therefor.
In Column 20, Line 61, delete "into in" and insert -- into --, therefor.
In Column 21, Line 31, delete "synchronized" and insert -- synchronized with --, therefor.

Signed and Sealed this
Sixth Day of January, 2026

John A. Squires
*Director of the United States Patent and Trademark Office*

CERTIFICATE OF CORRECTION (continued)
U.S. Pat. No. 12,458,438 B2

In Column 21, Line 54, delete "axis" and insert -- axes --, therefor.
In Column 22, Line 16, delete "could" and insert -- cloud --, therefor.

In the Claims

In Column 28, Line 14, in Claim 14, delete "cloud the" and insert -- cloud, the --, therefor.
In Column 28, Line 32, in Claim 18, delete "catheter and" and insert -- and --, therefor.
In Column 28, Line 39, in Claim 20, delete "claim" and insert -- of claim --, therefor.